Dec. 30, 1930.   W. E. DUNNING   1,787,237
FILING APPLIANCE
Filed Feb. 24, 1928   2 Sheets-Sheet 1

Inventor
William E. Dunning
By Freast and Bond
Attorneys

Dec. 30, 1930.　　　W. E. DUNNING　　　1,787,237
FILING APPLIANCE
Filed Feb. 24, 1928　　2 Sheets-Sheet 2

Inventor
William E. Dunning
By Frease and Bond
Attorneys

Patented Dec. 30, 1930

1,787,237

UNITED STATES PATENT OFFICE

WILLIAM E. DUNNING, OF ALLIANCE, OHIO, ASSIGNOR TO THE McCASKEY REGISTER COMPANY, OF ALLIANCE, OHIO, A CORPORATION OF OHIO

FILING APPLIANCE

Application filed February 24, 1928. Serial No. 256,563.

The invention relates to filing appliances for filing bills and similar papers and more particularly to an improvement upon the appliance disclosed in the application of William E. Dunning and Jacob Bachofen, Serial No. 144,620, filed October 27, 1926.

Filing appliances of the kind disclosed in the aforesaid application comprise a series of hinged holder frames or leaves operatively mounted upon a supporting post, the leaves being hingedly connected together in vertical position, whereby each leaf remains vertical regardless of the position to which it may be moved in use.

In the application above referred to, the leaves are supported from a stationary or fixed post, whereby the positions from which the leaves are accessible are limited to the swinging movement of the leaves.

The object of the present improvement is to provide such a filing appliance upon a post which is mounted upon a revoluble plate or disk, whereby access may be had to the leaves from any angle entirely around the post.

With the improved construction, the filing appliance may be mounted upon a counter or table in the center of a room, so that access may be had to the filing leaves from all sides thereof, or the appliance may be mounted in an opening in a wall between two rooms, whereby the same may be revolved so that access may be had to the leaves from either room.

Figure 1:
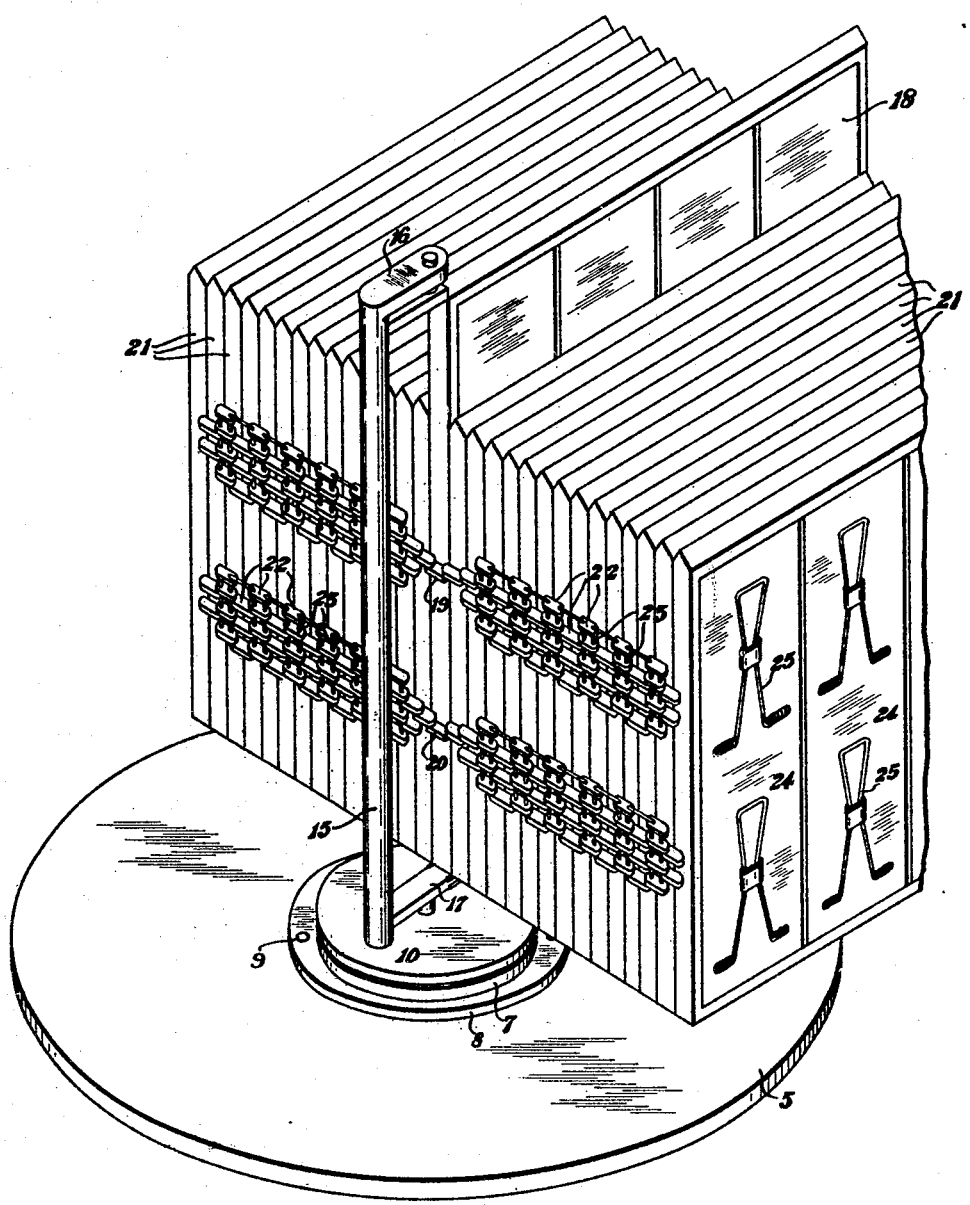
Figure 2:
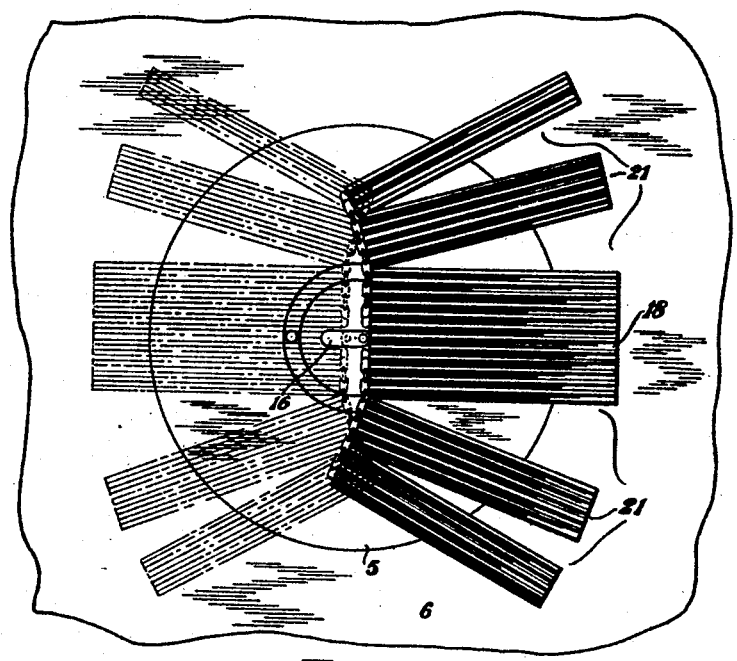
Figure 3:
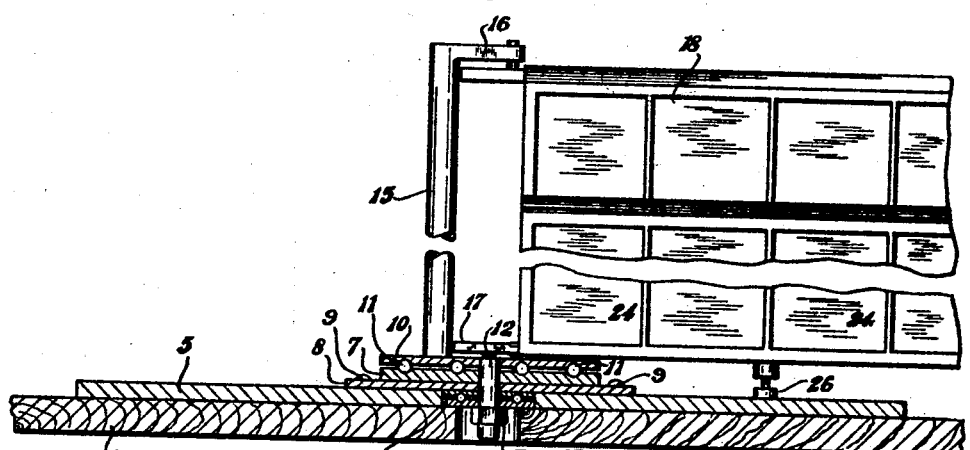

An embodiment of the invention is illustrated in the accompanying drawings, in which Figure 1 is a perspective view of the improved filing appliance;

Fig. 2, a plan view of the same, upon a smaller scale, illustrating in broken lines the manner in which the appliance may be revolved; and Fig. 3, a vertical sectional view through the appliance, showing the bearings by means of which the same is revoluble.

Similar numerals refer to similar parts throughout the several figures of the drawings.

In the accompanying drawings, the filing appliance is illustrated as mounted upon a base 5, which may be supported upon the table or shelf 6 in any suitable and well known manner.

A ball race 7 may be centrally fixed upon the base 5 as by the flange 8 and rivets or screws 9. The upper ball race 10 is rotatably connected to the lower race 7, resting upon the antifriction balls 11 and a center post 12 depends from the upper ball race and is located through the lower ball race, and provided with a nut 13 or the like for holding the parts in assembled position. If desired, a ball bearing 14 may be provided between the flanged portion 8 of the lower ball race and the nut 13.

The upright post 15 is eccentrically mounted upon the upper ball race 10 in any suitable manner, and provided at its upper end with the inturned angular arm 16 located directly above and in alignment with the lower angular arm 17.

The index leaf 18 is connected at its rear edge portion to the arms 16 and 17, and is provided at its rear edge with the spaced upper and lower ears 19 and 20 respectively.

The filing appliance per se includes two banks of bill holder frames or leaves 21, one bank being located upon each side of the index leaf. All of the leaves of each bank are hingedly connected together at their rear edges as by the interengaging hinge ears 22 and pintles 23.

The innermost leaf of each bank is hingedly connected to the ears 19 and 20 of the index leaf, so that the outer ends of all the leaves may swing free to and from each other, as illustrated and described in the Dunning and Bachofen application above referred to.

Recesses 24 and spring clips 25 may be provided upon opposite faces of all of the bill holder leaves, for receiving and clamping sales bills and the like in well known manner. Friction feet 26, as described in the above mentioned application, may also be provided upon all of the leaves for engagement with the upper surface of the base 5.

As illustrated in Fig. 2, the entire appliance may be revolved into any position so that access may be had to any of the leaves from any point entirely around the same.

With the appliance revolved into any desired position, the leaves may be opened at any point, permitting several persons to have access to different parts of the appliance at one time.

Such a construction will permit the placing of the appliance upon a counter or table at any point where it may be used from all sides, making it only necessasry for the person approaching the appliance from any side to revolve the same to a position where it is accessible from that point.

I claim:—

1. A filing appliance including a base, a revoluble plate on the base, an upright support upon said plate, and a series of upright holders hinged together at their rear ends for swinging apart at their forward ends, one of said holders being connected to said upright support.

2. A filing appliance including a base, a revoluble plate on the base, an upright support mounted upon said plate, and a series of upright holders hinged together at their rear ends for swinging apart at their forward ends, the central holder of the series being connected to said upright support.

3. A filing appliance including a base, a revoluble plate on the base, an upright support mounted upon said plate, a series of upright holders hinged together at their rear ends for swinging apart at their forward ends, one of said holders being connected to said upright support, and individual friction means for holding each of the holders in any position to which they are swung relative to the other holders.

4. A filing appliance including a base, a revoluble plate on the base, and upright support mounted on said plate, a series of upright holders hinged together at their rear ends for swinging apart at their forward ends, the central holder of the series being connected to said upright support, and individual friction means for holding each of the holders in any position to which they are swung relative to the other holders.

5. A filing appliance including a base, a plate revoluble about its own axis and supported by the base, an upright support mounted on said plate eccentrically to the axis of the plate, and a series of upright holders hinged together at their rear ends for swinging apart at their forward ends, one of said holders being connected to said upright support.

6. A filing appliance including a base, a plate revoluble about its own axis and supported by the base, an upright support mounted on said plate eccentrically to the axis of the plate, and a series of upright holders hinged together at their rear ends for swinging apart at their forward ends, the central holder of the series being connected to said upright support.

In testimony that I claim the above, I have hereunto subscribed my name.

WILLIAM E. DUNNING.